US012208629B2

(12) United States Patent
Maruyama et al.

(10) Patent No.: US 12,208,629 B2
(45) Date of Patent: Jan. 28, 2025

(54) RECORDING APPARATUS

(71) Applicant: CANON KABUSHIKI KAISHA, Tokyo (JP)

(72) Inventors: Taiji Maruyama, Kanagawa (JP); Atsushi Kohnotoh, Tokyo (JP); Yasuyuki Takanaka, Kanagawa (JP); Norio Sakurai, Tokyo (JP); Takashi Abe, Kanagawa (JP); Kousuke Tanaka, Kanagawa (JP); Yusuke Naratani, Tokyo (JP); Shuhei Yamaguchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 190 days.

(21) Appl. No.: 18/045,215

(22) Filed: Oct. 10, 2022

(65) Prior Publication Data

US 2023/0115030 A1 Apr. 13, 2023

(30) Foreign Application Priority Data

Oct. 12, 2021 (JP) ................................ 2021-167715

(51) Int. Cl.
*B41J 25/304* (2006.01)
*B41J 29/02* (2006.01)

(52) U.S. Cl.
CPC ............ *B41J 25/304* (2013.01); *B41J 29/02* (2013.01)

(58) Field of Classification Search
CPC .......... B41J 19/00; B41J 25/304; B41J 29/02
See application file for complete search history.

(56) References Cited

U.S. PATENT DOCUMENTS

2018/0339534 A1* 11/2018 Takei .................... B41J 29/023

FOREIGN PATENT DOCUMENTS

JP 2015160343 A 9/2015
JP 6288432 * 3/2018 ............. B41J 19/20

* cited by examiner

*Primary Examiner* — Anh T Vo
(74) *Attorney, Agent, or Firm* — Canon U.S.A., Inc., IP Division

(57) ABSTRACT

A recording apparatus includes a conveyance unit, a carriage, a recording head, a frame, and a guide member. The conveyance unit conveys a sheet in a conveyance direction. The carriage moves in a scanning direction crossing the conveyance direction and has a first abutment portion and a second abutment portion higher in position than the first abutment portion. The recording head is mounted on the carriage, arranged to face a sheet conveyed by the conveyance unit, and ejects a liquid onto the conveyed sheet to record an image. The frame has a first sliding portion in abutment with the first abutment portion and has a second sliding portion in abutment with the second abutment portion. The guide member supports the carriage and is fixed to the frame at a position separated from the first sliding portion.

16 Claims, 12 Drawing Sheets

A-A

RECORDING APPARATUS

BACKGROUND

Field

The present disclosure relates to a recording apparatus that ejects ink from a recording head onto a sheet to record an image on the sheet.

Description of the Related Art

An ink-jet recording apparatus can record an image on the sheet by performing scanning with a recording head mounted on a carriage in a width direction of a sheet. Japanese Patent Application Laid-Open No. 2015-160343 describes a recording apparatus capable of adjusting the height of a guide portion that guides a carriage. In the recording apparatus, a frame supporting the carriage is fixed to a housing, and the guide portion is fixed to the frame so as to be adjustable in height.

SUMMARY

According to an aspect of the present disclosure, a recording apparatus includes a conveyance unit configured to convey a sheet in a conveyance direction, a carriage configured to move in a scanning direction crossing the conveyance direction and having a first abutment portion and a second abutment portion higher in position than the first abutment portion, a recording head mounted on the carriage, arranged to face a sheet conveyed by the conveyance unit, and configured to eject a liquid onto the conveyed sheet to record an image, a frame having a first sliding portion in abutment with the first abutment portion and having a second sliding portion in abutment with the second abutment portion, and a guide member that is configured to support the carriage and is fixed to the frame at a position separated from the first sliding portion.

Further features of the present disclosure will become apparent from the following description of exemplary embodiments with reference to the attached drawings.

DESCRIPTION OF THE EMBODIMENTS

Hereinafter, exemplary embodiments of the present disclosure will be described with reference to the drawings. The following exemplary embodiments do not limit the present disclosure. All of the combinations of features described in relation to the exemplary embodiments are not necessarily essential to the solution of the present disclosure. Identical components will be indicated with the same reference signs in the descriptions. The relative arrangements, shape, and the like of the components of the exemplary embodiments are mere exemplifications, and the scope of the present disclosure is not intended to be limited to these exemplifications.

Exemplary Embodiments

Exemplary embodiments will be described with reference to the drawings. The following exemplary embodiments are not intended to limit the present disclosure set forth in the claims. A plurality of features of the exemplary embodiments may be combined in any way. Duplicated descriptions of the drawings may be omitted. In the present disclosure, the term "recording" refers to not only forming significant information such as text and graphics but also forming an image, a design, a pattern, or the like on a sheet or applying treatment to a medium. The term "sheet" refers to not only recording paper used on a general image formation apparatus but also any conveyable media such as cloth, plastic film (overhead projector (OHP) film), metallic plate, glass, ceramics, wood material, and leather material.

<Ink-Jet Recording Apparatus>

Figure 1:
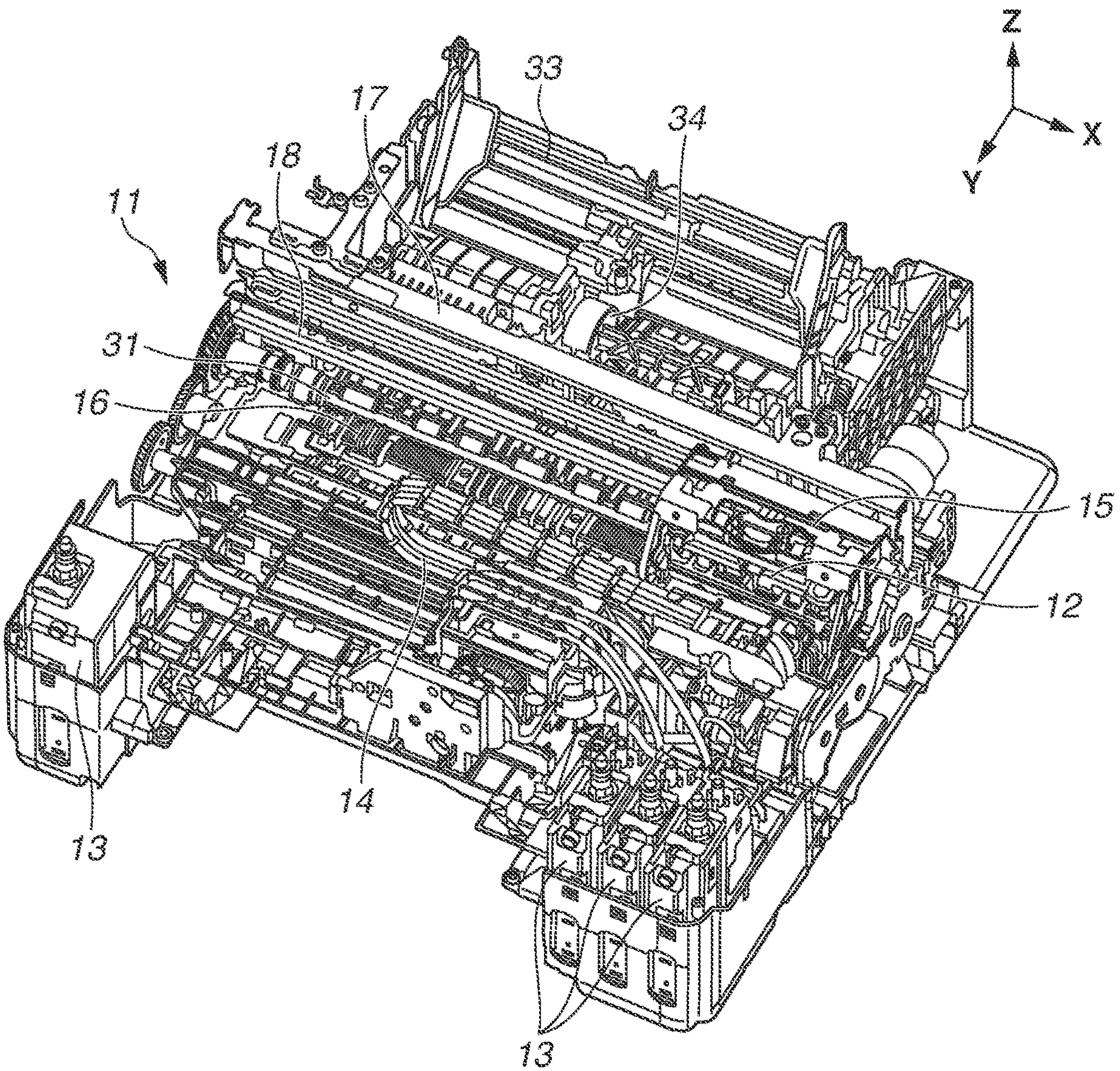
FIG. 1 is a perspective view schematically illustrating inside of an ink-jet recording apparatus.
Figure 2:
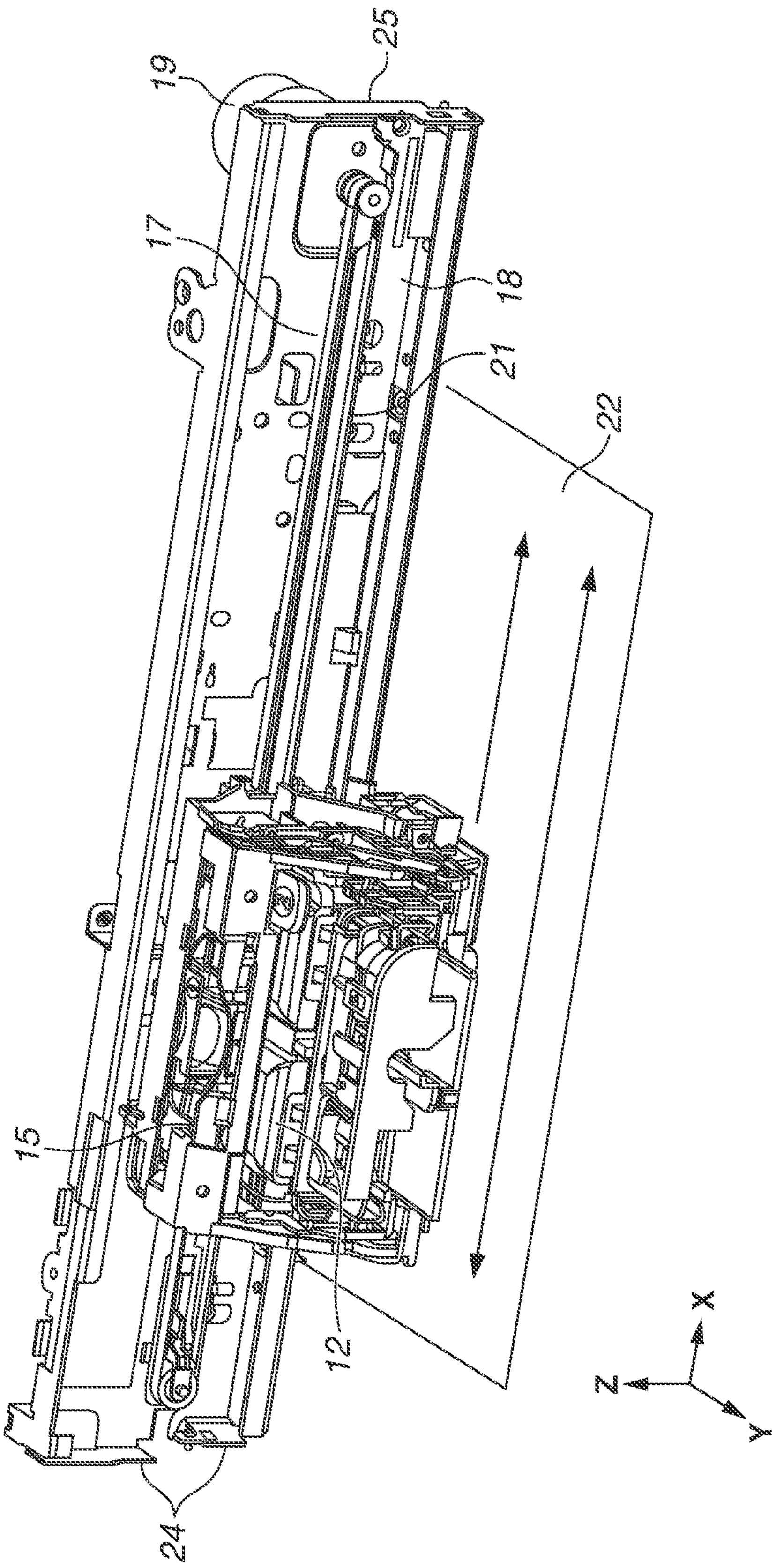
FIG. 2 is a conceptual diagram illustrating recording of an image on a sheet.

An ink-jet recording apparatus according to the present exemplary embodiment will be described with reference to FIGS. 1 and 2. FIG. 1 is a perspective view schematically illustrating inside of the recording apparatus. FIG. 2 is a conceptual diagram illustrating recording of an image on a sheet.

A recording apparatus 11 includes a tray in which sheets that are recording media are stacked, a conveyance unit that conveys the sheets, a recording unit that ejects ink onto a conveyed sheet, an ink tank that supplies ink to the recording unit, and the like. First, one of the sheets stacked in a tray 33 on the rear side or lower side of the recording apparatus 11 is fed by a feed roller 34. The sheet fed by the feed roller 34 from the tray 33 on the rear side is conveyed by a conveyance roller 31 that is a conveyance unit in a conveyance direction (Y direction). The sheet conveyed by the conveyance roller 31 is supported on a platen 16. An image is recorded on the sheet by a recording head 12 that is a recording unit. The recording head 12 is detachably mounted on a carriage 15. The carriage 15 is movable in a scanning direction (X direction) along a frame 17 for supporting the carriage 15. The scanning direction is a direction crossing (orthogonal to) the conveyance direction. Thus, while being held to face the platen 16 by the carriage 15, the recording head 12 is movable in the scanning direction.

Ink to be supplied to the recording head 12 is stored in ink tanks 13 on the front side of the recording apparatus. The plurality of ink tanks 13 is arranged in correspondence with colors of ink on both sides of the sheet in the width direction of the sheet. Supply tubes 14 are ink supply paths for supplying the ink from the ink tanks 13 to the recording head 12. As the carriage 15 moves, the ink supply paths move along with the carriage 15. In the present exemplary embodiment, the ink is supplied to the recording head 12 through the supply tubes 14. Alternatively, the recording apparatus 11 may be an on-carriage recording apparatus in which detachable liquid tanks are mounted on the carriage.

The frame 17 has a motor 19 and a belt 21 stretched around the motor 19. The frame 17 further includes a guide member 18 that supports the carriage 15 and guides a movement of the carriage 15. When the belt 21 is driven by the motor 19, the carriage 15 can reciprocate in the scanning direction, which is the width direction of the sheet. A scanning range of the carriage 15 is between a left side plate 24 at one end of the frame 17 and a right side plate 25 at the other end of the frame 17. The guide member 18 allows the recording head 12 to move with a predetermined space kept from the platen 16 in a vertical direction. During the movement of the carriage 15, the recording head 12 ejects ink that is a liquid onto the sheet. In a recording operation of recording an image on the sheet, first, a conveyance roller 31 performs a conveyance operation of conveying the sheet. Then, the recording head 12 performs an eject operation of ejecting the ink while moving. By serial processing of alternately performing the conveyance operation and the eject operation, a desired image is formed on the sheet.

If the frame 17 and the guide member 18 are insufficient in rigidity, the frame 17 may be deformed or generate vibration due to the movement of the carriage 15. The deformation and vibration of the frame 17 causes the position of the recording head 12 with respect to the platen 16 to be unstable. If the position of the recording head 12 becomes unstable, a landing position of ink on the sheet may be shifted, which may result in deterioration of image quality. Thus, it is important to enhance the rigidity of the frame 17 including the guide member 18 in order to improve the image quality.

<Structures of Carriage and Frame>

Hereinafter, structures of the carriage 15 and the frame 17 will be described with reference to FIGS. 3A to 8.

Figure 3A:
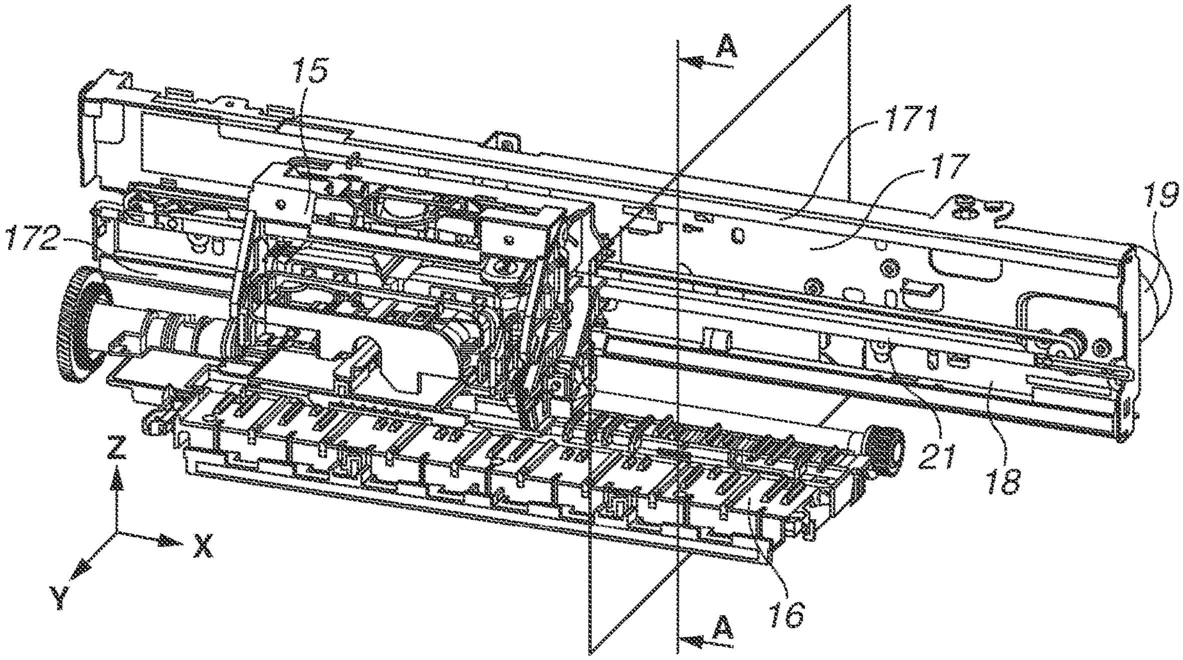
FIGS. 3A and 3B are diagrams illustrating a relationship between a carriage and a frame.
Figure 3B:
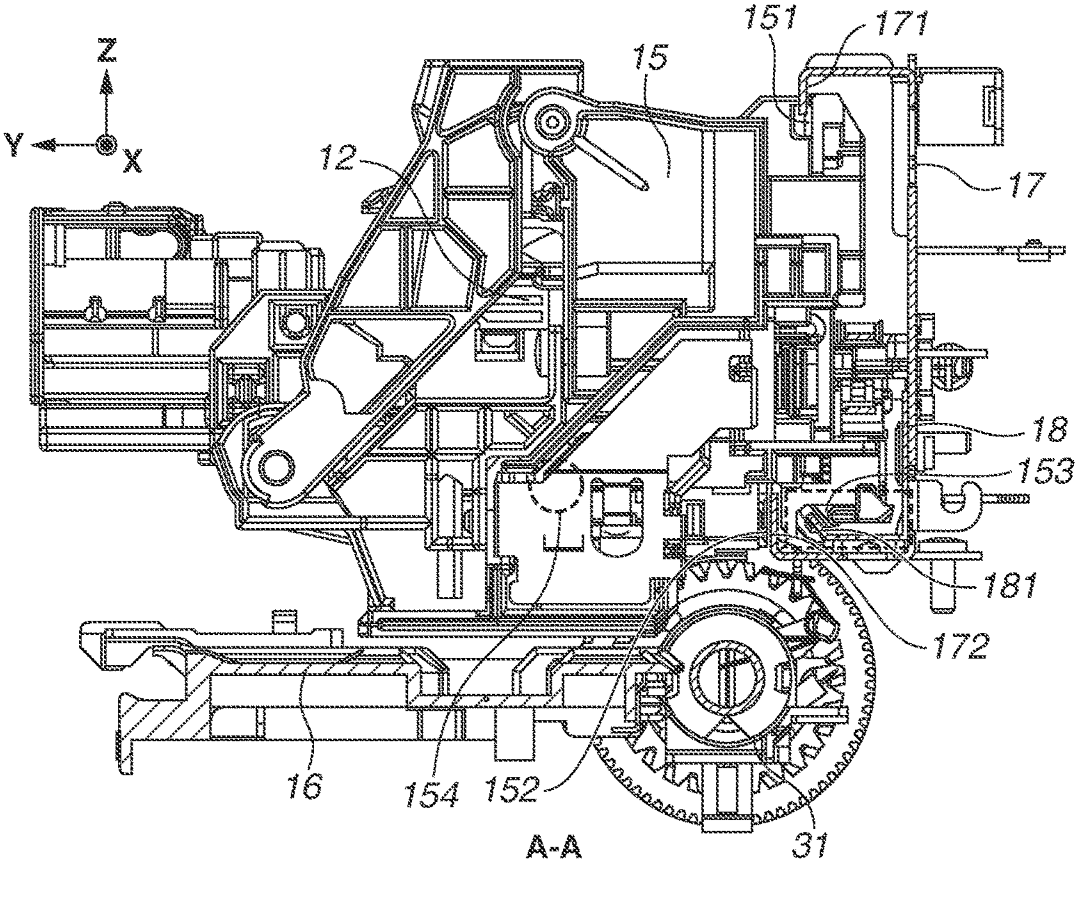
Figure 4A:
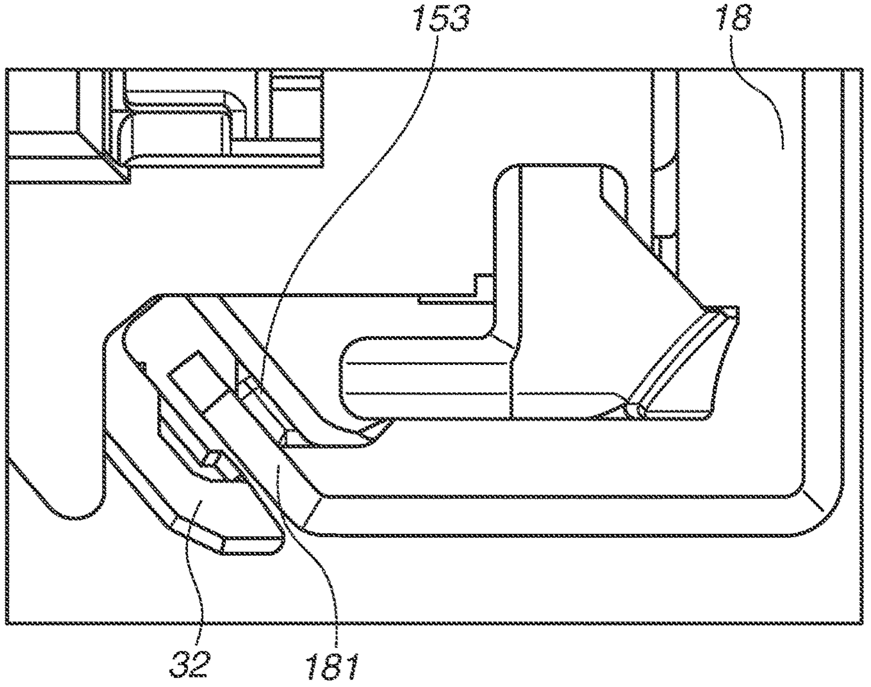
FIGS. 4A and 4B are diagrams illustrating a sliding body of the carriage.
Figure 4B:
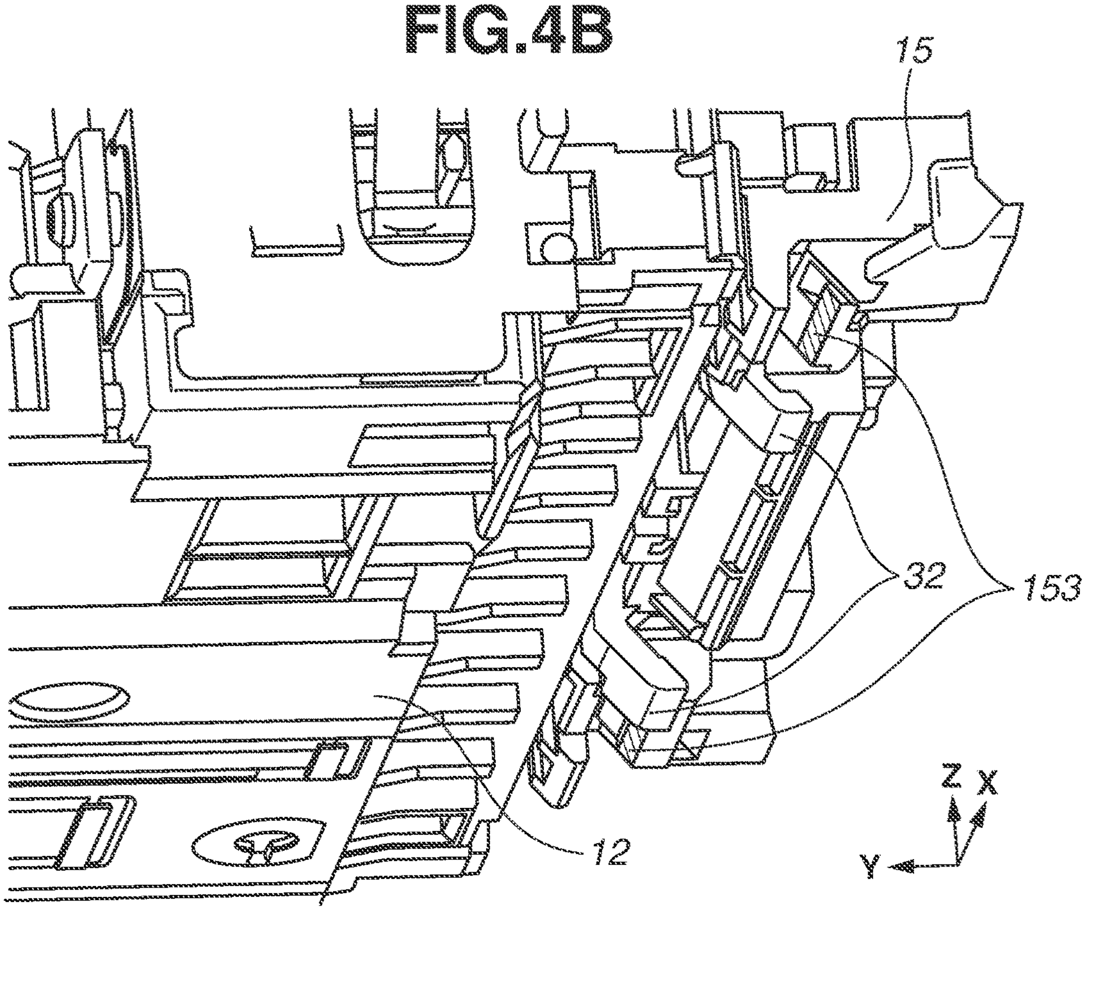
Figure 5:
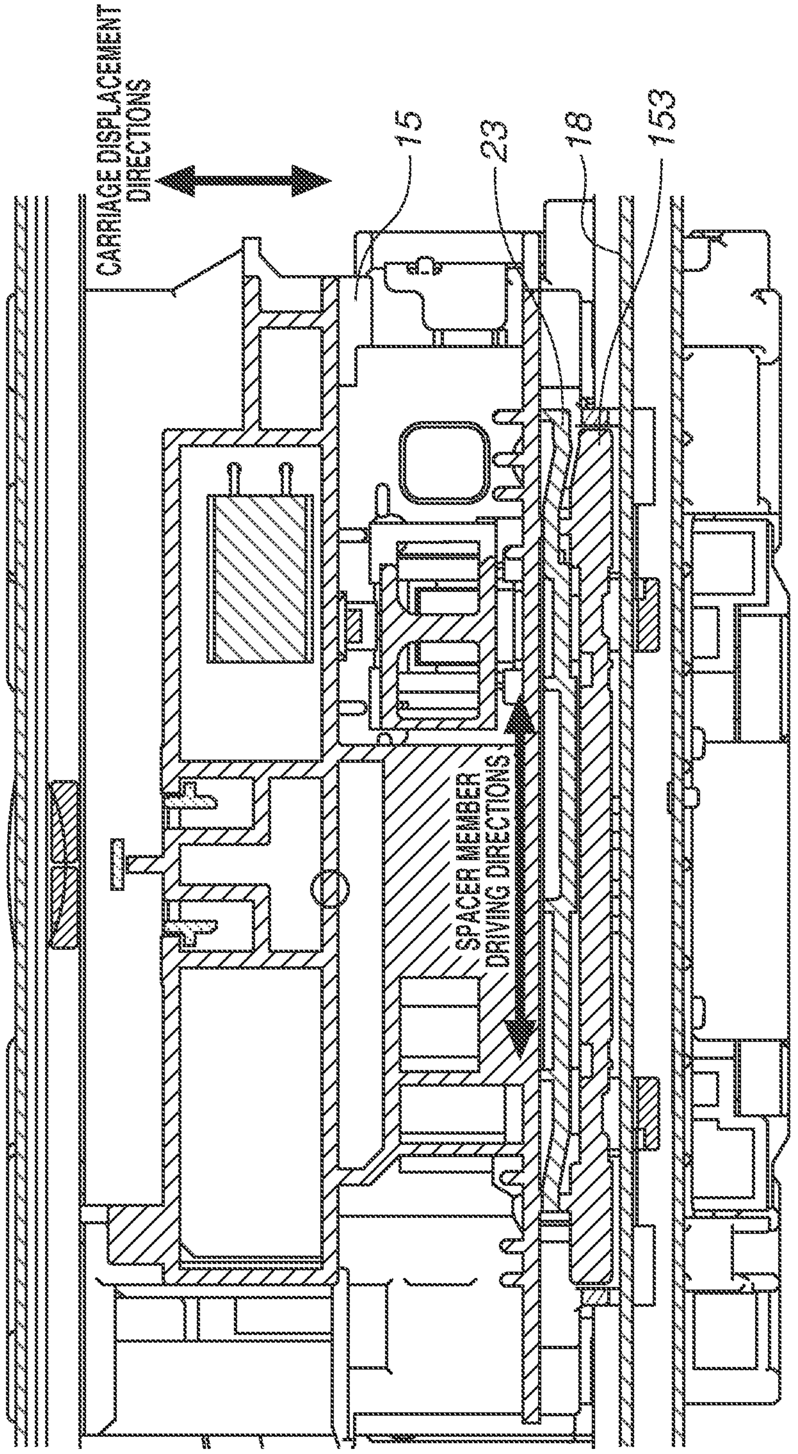
FIG. 5 is a rear view of the carriage.
Figure 6A:
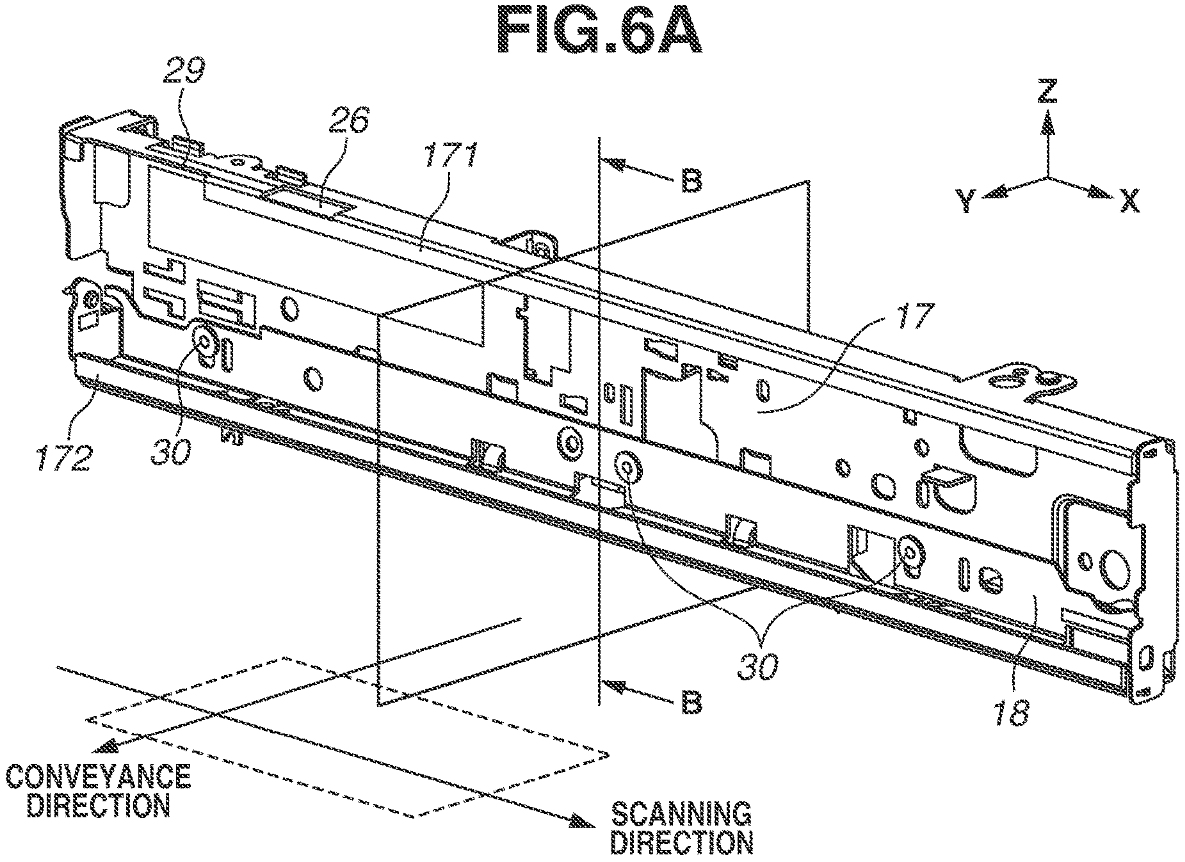
FIGS. 6A, 6B, and 6C are diagrams illustrating structures of the frame and a guide member.
Figure 6B:
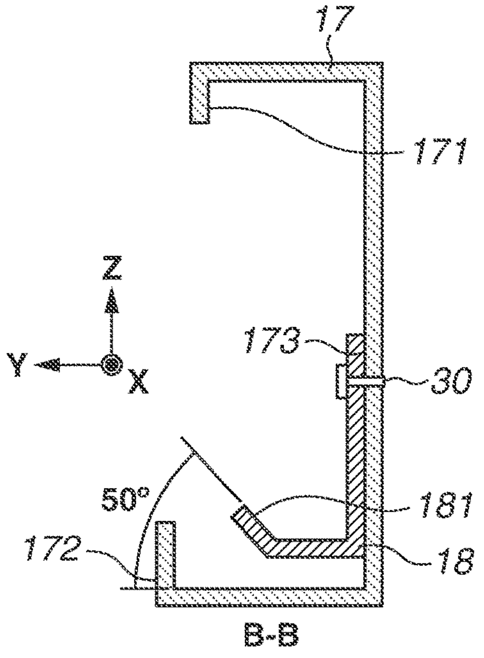
Figure 6C:
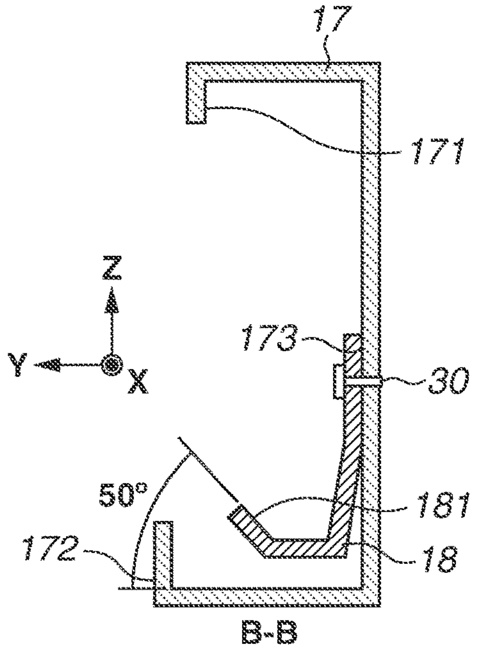
Figure 7A:
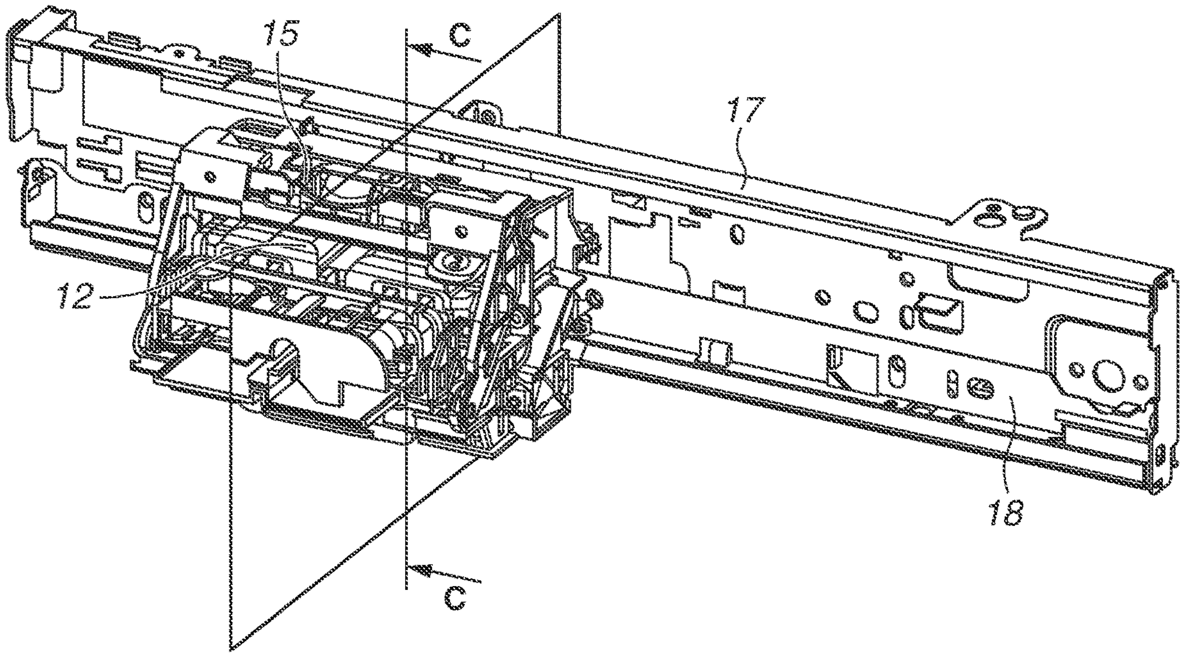
FIGS. 7A, 7B, and 7C are schematic diagrams illustrating an influence of vibration of the guide member on the carriage.
Figure 7B:
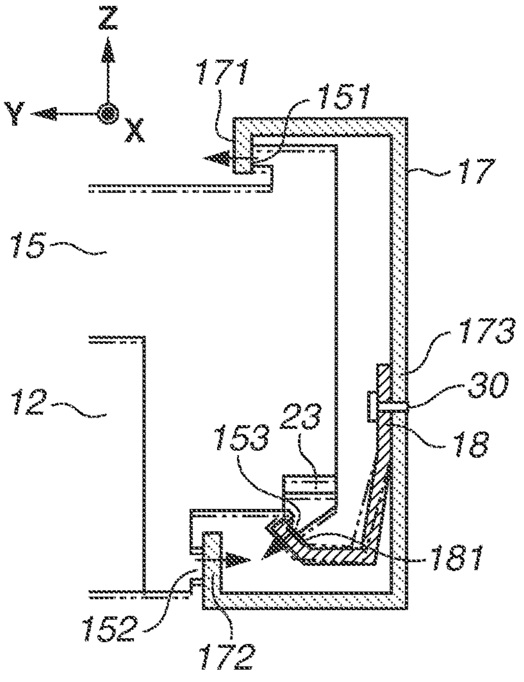
Figure 7C:
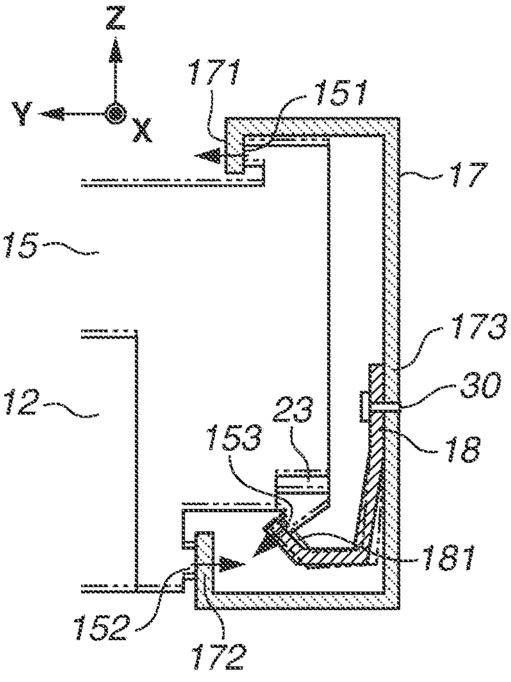
Figure 8A:
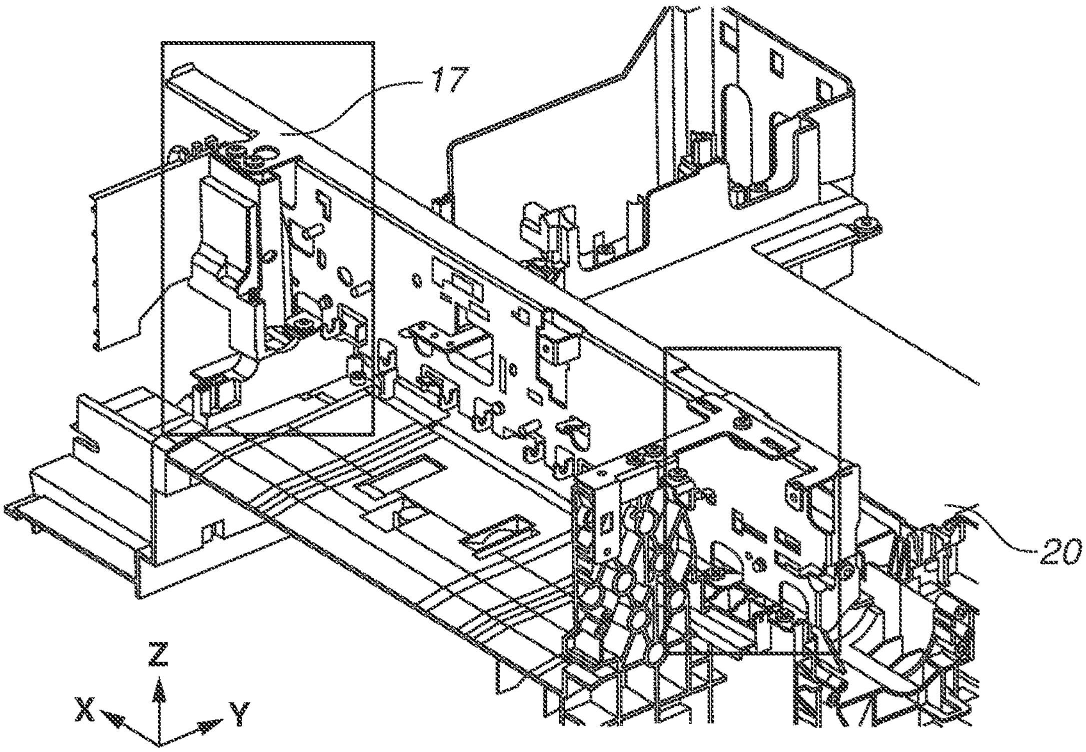
FIGS. 8A, 8B, and 8C are perspective views of fixing portions of the frame to a housing.
Figure 8B:
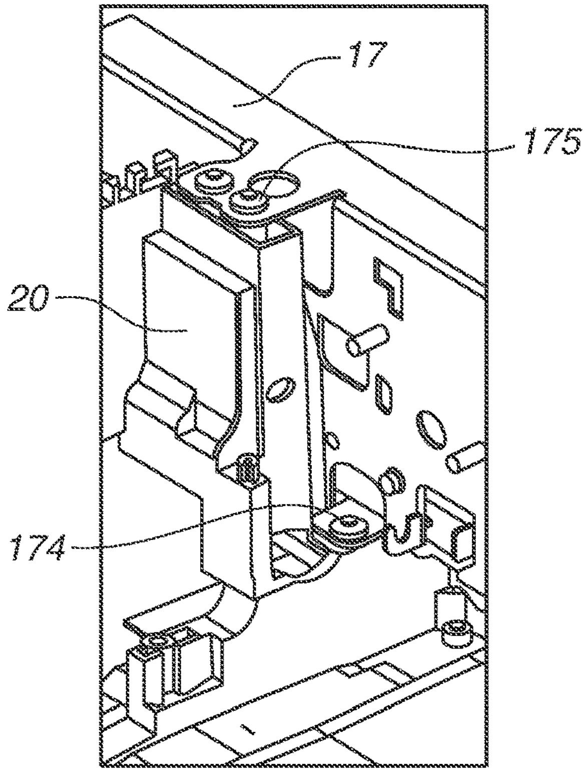
Figure 8C:
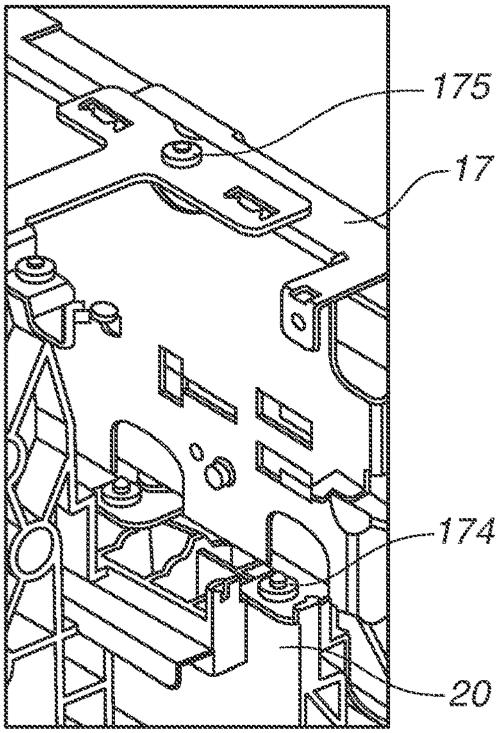
Figure 9A:
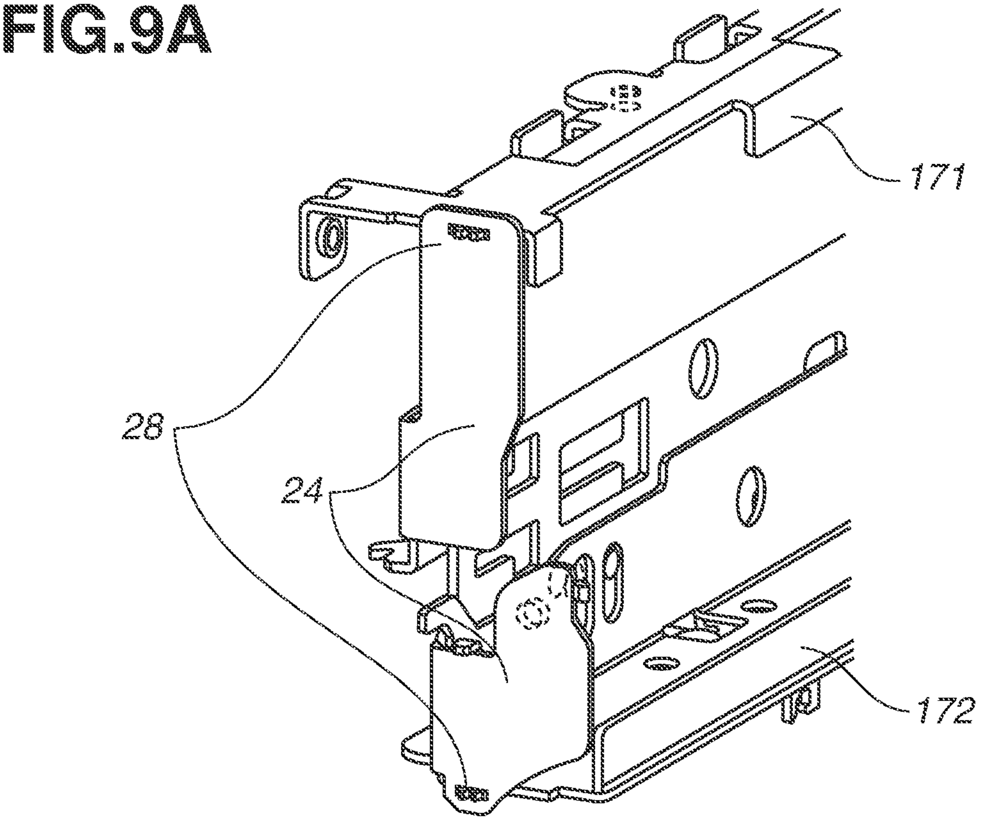
FIGS. 9A and 9B are diagrams illustrating side plates of the frame.
Figure 9B:
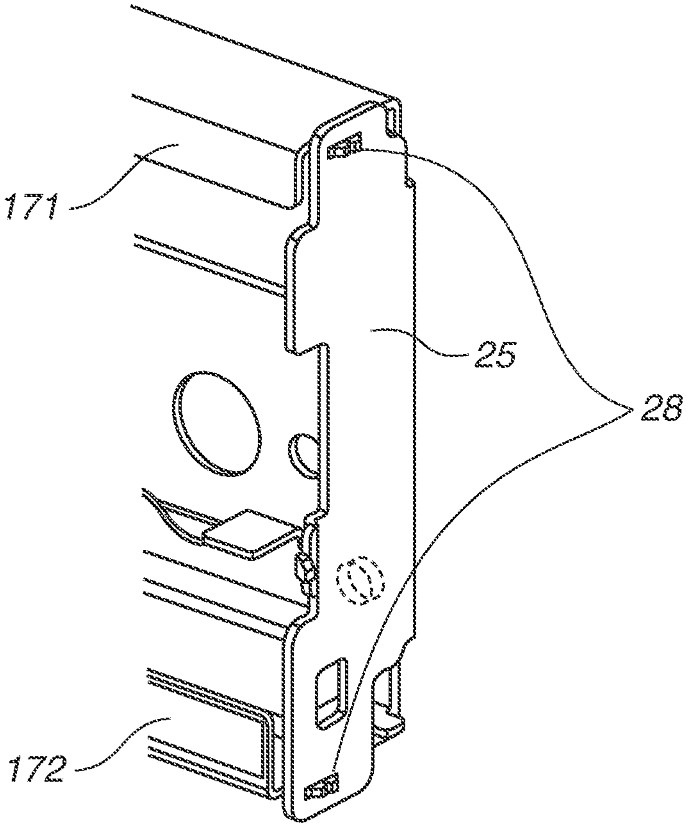

FIGS. 3A and 3B are diagrams illustrating the structures of the carriage 15 and the frame 17. FIG. 3A is a perspective view of the carriage 15 and the frame 17. FIG. 3B is a cross-sectional view taken along line A-A in FIG. 3A. FIGS. 4A and 4B are diagrams illustrating a sliding body of the carriage 15. FIG. 4A is an enlarged view of a dotted-line part in FIG. 3B. FIG. 4B is a perspective view of the sliding body of the carriage 15. FIG. 5 is a rear view of the carriage 15. FIGS. 6A, 6B, and 6C are diagrams illustrating a relationship between the frame 17 and the guide member 18. FIG. 6A is a diagram illustrating the frame 17 to which the guide member 18 is fixed. FIG. 6B is a schematic cross-sectional view taken along line B-B in FIG. 6A. FIGS. 7A to 7C are schematic diagrams illustrating an influence of vibration of the guide member 18 on the carriage 15. FIG. 7A is a perspective view illustrating a state where the carriage 15 is supported by the guide member 18. FIGS. 7B and 7C are schematic cross-sectional views taken along line C-C in FIG. 7A illustrating the influence of vibration of the guide member 18 on the carriage 15. FIGS. 8A to 8C are perspective views of fixing portions of the frame 17 to a housing 20.

The carriage 15 has an upper abutment portion 151 that is in abutment with an upper sliding portion 171 of the frame 17 and a lower abutment portion 152 that is in abutment with a lower sliding portion 172 of the frame 17. The frame 17 is formed to be bent along lines parallel to the scanning direction of the carriage 15. The upper sliding portion 171 is located at one end of the bent frame 17, and the lower sliding portion 172 is located at the other end of the frame 17. Thus, the upper sliding portion 171 and the lower sliding portion 172 are parallel to the scanning direction. As seen in the direction perpendicular to the carriage 15, the upper abutment portion 151 is arranged above the lower abutment portion 152. A sliding surface of the upper sliding portion 171 faces a direction opposite to the conveyance direction (a direction from downstream to upstream of the conveyance direction). The upper abutment portion 151 faces the conveyance direction of the sheet (a direction from upstream to downstream of the conveyance direction). On the other hand, a sliding surface of the lower sliding portion 172 faces the conveyance direction, and the lower abutment portion 152 faces the direction opposite to the conveyance direction of the sheet. The upper sliding portion 171 and the lower sliding portion 172 define the position of the carriage 15 with respect to the conveyance direction. More specifically, the upper sliding portion 171 and the lower sliding portion 172 define the position of the recording head 12 arranged on the carriage 15 with respect to the conveyance direction.

The frame 17 includes fastening portions 30 that fix the guide member 18 between the upper surface and lower surface of the frame 17 in the vertical direction. The guide member 18 fixed with screws and the fastening portions 30 slidably supports a sliding body 153 of the carriage 15 from below by a guide surface 181. The guide surface 181 is uniformly provided in the scanning direction of the carriage 15. The sliding body 153 has two abutment surfaces (hatched areas in FIG. 4B) provided on the lower rear side of the carriage 15, at positions separated from each other in the scanning direction. The guide surface 181 forms a predetermined angle with respect to the conveyance direction (Y direction) on a YZ plane. In this example, the predetermined angle is 50 degrees, but the angle may be any angle at which the carriage 15 can be supported, i.e., 0 to 89 degrees. However, the predetermined angle is desirably within a range of 40 to 60 degrees at which the guide surface 181 is inclined upward in the conveyance direction. The recording head 12 of the carriage 15 is supported by the guide member 18 to maintain a predetermined space from the platen 16 in the vertical direction. The carriage 15 has a stairstep spacer member 23 arranged above the sliding body 153.

The space of the recording head 12 from the platen 16 can be changed by moving the spacer member 23 in the scanning direction with respect to the carriage 15. Thus, the spacer member 23 allows image recording on various types of sheet different in thickness.

The guide member 18 is fastened to the frame 17 with screws at the plurality of fastening portions in the frame 17 arranged in the scanning direction. The guide member 18 has long holes for insertion of the screws. When the guide member 18 is fixed to the frame 17, the guide member 18 is adjusted in position with respect to the frame 17 by the long holes that are height adjustment portions. By adjustment of the position of the guide member 18, the height of the recording head 12 with respect to the platen 16 can be adjusted in the vertical direction. The adjustment portions may be provided in the frame 17. The guide member 18 and the frame 17 may be fixed by an adhesive, welding, or another mechanism. A fastening surface 173 of the frame 17 to which the guide member 18 is fixed and an opposing surface of the guide member 18 opposing the carriage 15 are each parallel to an XZ plane. The fastening surface 173 is located at a position separated from the sliding surface of the upper sliding portion 171 and the sliding surface of the lower sliding portion 172 on the upstream side in the conveyance direction. In this example, the lower sliding portion 172, the upper sliding portion 171, and the fastening surface 173 are arranged in this order toward the upstream side in the conveyance direction. The guide member 18 is located between the fastening surface 173 and the lower sliding portion 172 in the conveyance direction. When the guide member 18 and the frame 17 are fixed together, the fastening surface 173 and the opposing surface come into abutment with each other. However, as illustrated in FIG. 6C, a gap may be partially made between the fastening surface 173 of the frame 17 and the opposing surface of the guide member 18 depending on part processing accuracy of the frame 17 and the guide member 18. In this case, the vibration of the guide member 18 due to the movement of the carriage 15 becomes greater.

A position of center of gravity 154 of the carriage 15 is located downstream in the conveyance direction with respect to the frame 17. The carriage 15 is vertically supported by the guide member 18. Thus, the upper sliding portion 171 of the frame 17 is subjected to a force in the conveyance direction from the upper abutment portion 151.

On the other hand, the lower sliding portion 172 of the frame 17 is subjected to a force in the direction opposite to the conveyance direction from the lower abutment portion 152. The guide surface 181 is subjected to a force from the sliding body 153 in a direction in which the conveyance direction and the vertically downward direction are combined. The directions of the forces are illustrated by arrows in FIGS. 7B and 7C.

When the carriage 15 seeks to move downward as illustrated in FIG. 7B, the sliding body 153 of the carriage 15 is subjected to drag from the guide surface 181. Then, the carriage 15 seeks to move in the direction opposite to the conveyance direction (from downstream to upstream in the conveyance direction). However, the movement of the lower abutment portion 152 in the direction opposite to the conveyance direction is restricted by the lower sliding portion 172. As a result, the movement of the carriage 15 in the direction opposite to the conveyance direction is suppressed. If the carriage 15 seeks to move upward as illustrated in FIG. 7C, the center of gravity of the carriage 15 is located downstream of the frame 17 in the conveyance direction, and the carriage 15 then seeks to move in the conveyance direction. However, the movement of the upper abutment portion 151 in the conveyance direction is restricted by the upper sliding portion 171. As a result, the movement of the carriage 15 in the conveyance direction is restrained. In other words, if the carriage 15 seeks to vibrate vertically, the recording head 12 mounted on the carriage 15 is restrained from moving upstream or downstream in the conveyance direction. In this manner, the position of the recording head 12 in the conveyance direction is unlikely to be affected by the vibration of the guide member 18. Accordingly, it is possible to reduce degradation of image quality that may be caused by a shift in the landing position of ink ejected from the recording head 12.

The housing 20 supports the platen 16 and the frame 17. The positional relationship between the frame 17 and the platen 16 is defined by their respective positions of fastening to the housing 20. The frame 17 has the lower surface fastened to the housing 20 in the Z direction at a plurality of fastening positions 174 spaced apart from each other in the scanning direction. The frame 17 also has the upper surface fastened to the housing 20 at a plurality of fastening positions 175. The fastening positions 174 are close to the lower sliding portion 172 in the conveyance direction and are located at a height of the same level as the lower sliding portion 172 in the vertical direction. The fastening positions 175 are close to the upper sliding portion 171 in the conveyance direction and are located at a height of the same level as the upper sliding portion 171 in the vertical direction. Therefore, even if the frame 17 generates vibration, the amplitude of the vibration is small.

The frame 17 is formed into a box shape to have enhanced rigidity. More specifically, the upper sliding portion 171 and the lower sliding portion 172 are parallel and opposite to the fastening surface 173 of the frame 17. The upper sliding portion 171 and the lower sliding portion 172 are fixed, on one side, by swaging portions 28 in the left side plate 24 of the frame 17, and are fixed, on the other side, by swaging portions 28 in the right side plate 25. The left side plate 24, the right side plate 25, the upper sliding portion 171, and the lower sliding portion 172 of the frame 17 are formed from one sheet metal member. As a result, the frame 17 has a box-shaped structure in which six sides are closed except for an opening through which the carriage 15 passes. The upper sliding portion 171, the lower sliding portion 172, the left side plate 24, and the right side plate 25 of the frame 17 are unremovable due to the swaging portions 28. The upper sliding portion 171, the lower sliding portion 172, the left side plate 24, and the right side plate 25 of the frame 17 may be separate members although the steps in an assembly process may increase. However, a frame formed of a plurality of components may result in an increased number of parts including screws, reduction in the rigidity of the frame, and a cost increase due to a larger number of steps in the assembly process.

<Procedure for Carriage Assembly>

Figure 10:
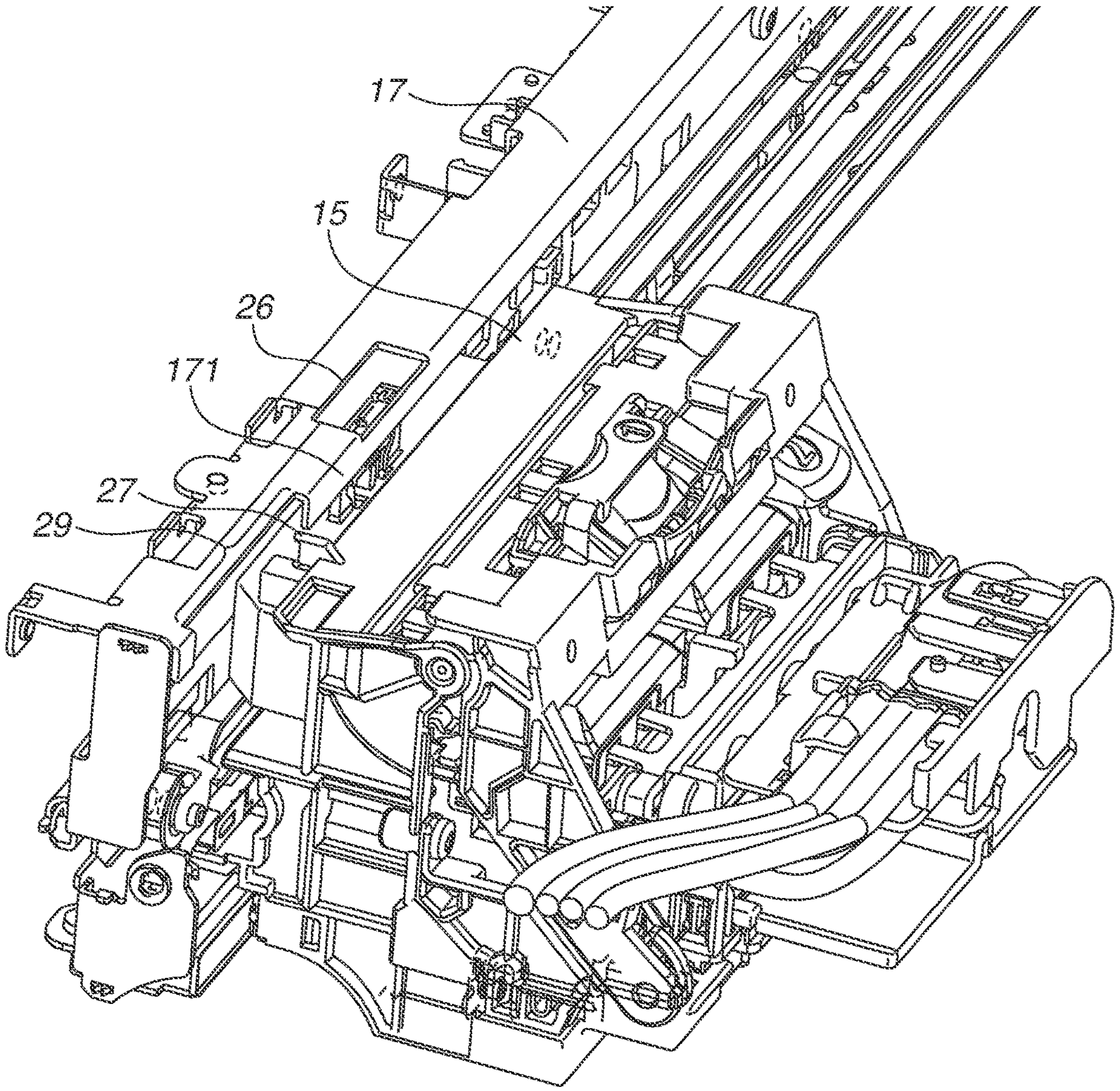
FIG. 10 is a diagram illustrating an assembly position of the carriage into the frame.
Figure 11A:
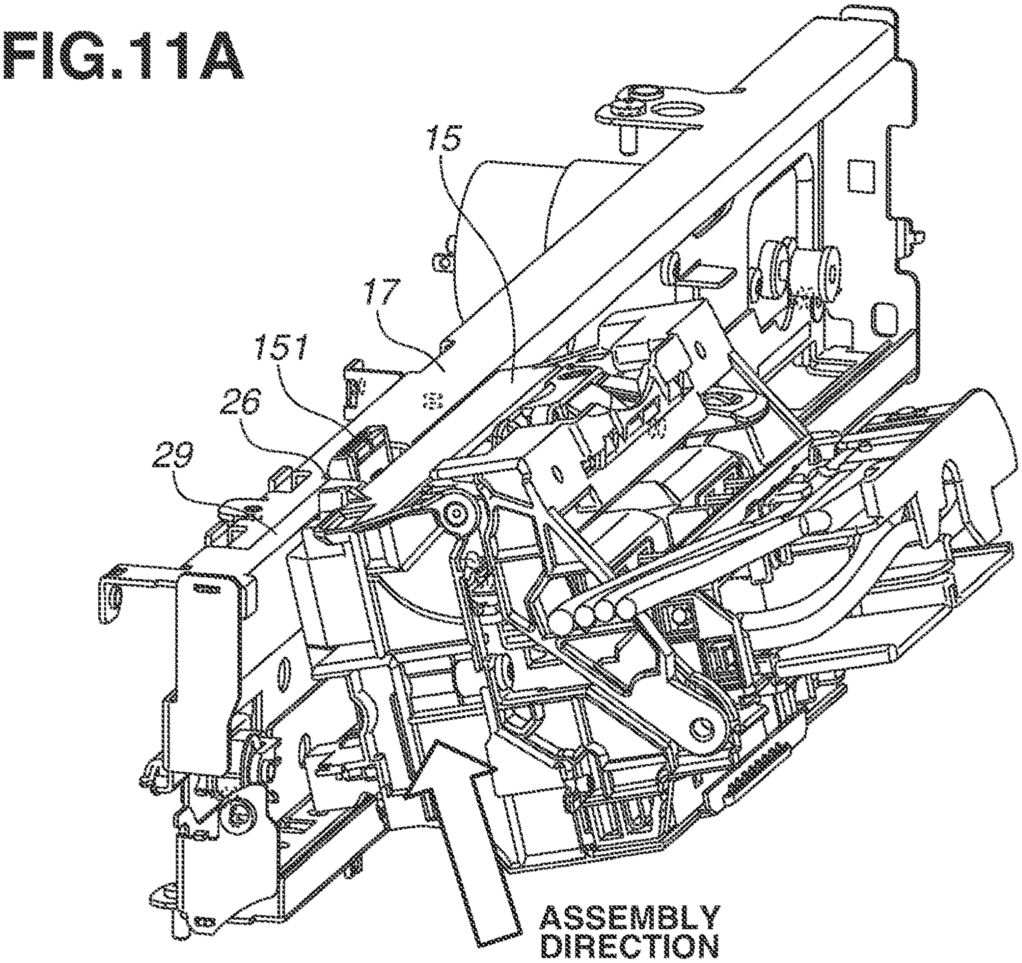
FIGS. 11A and 11B are diagrams illustrating the orientation of the carriage when being assembled into the frame.
Figure 11B:
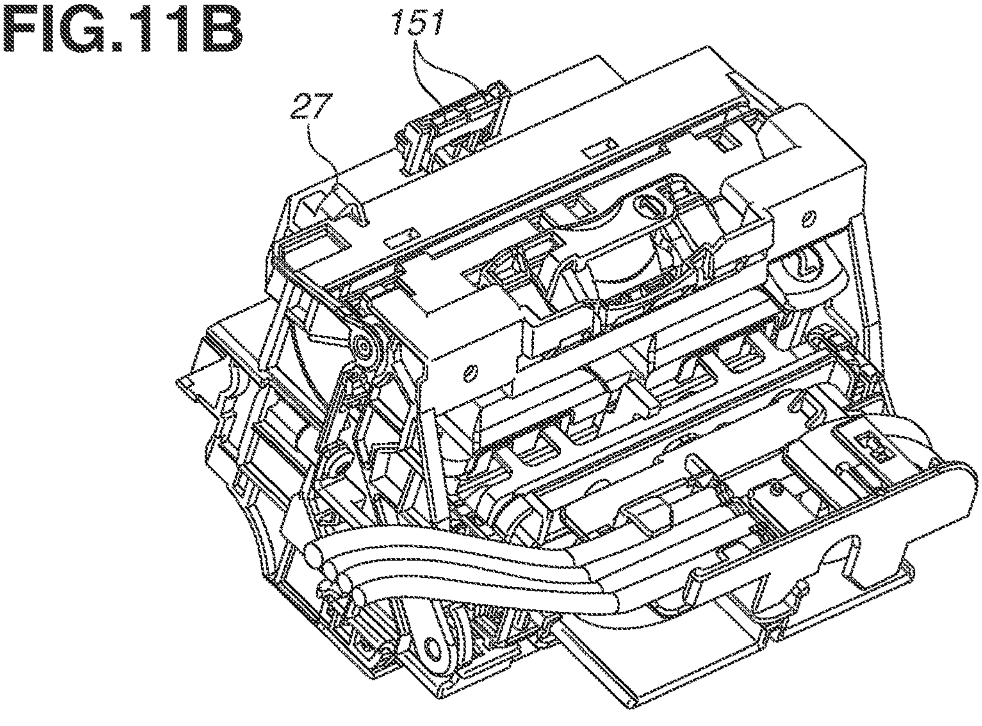
Figure 12A:
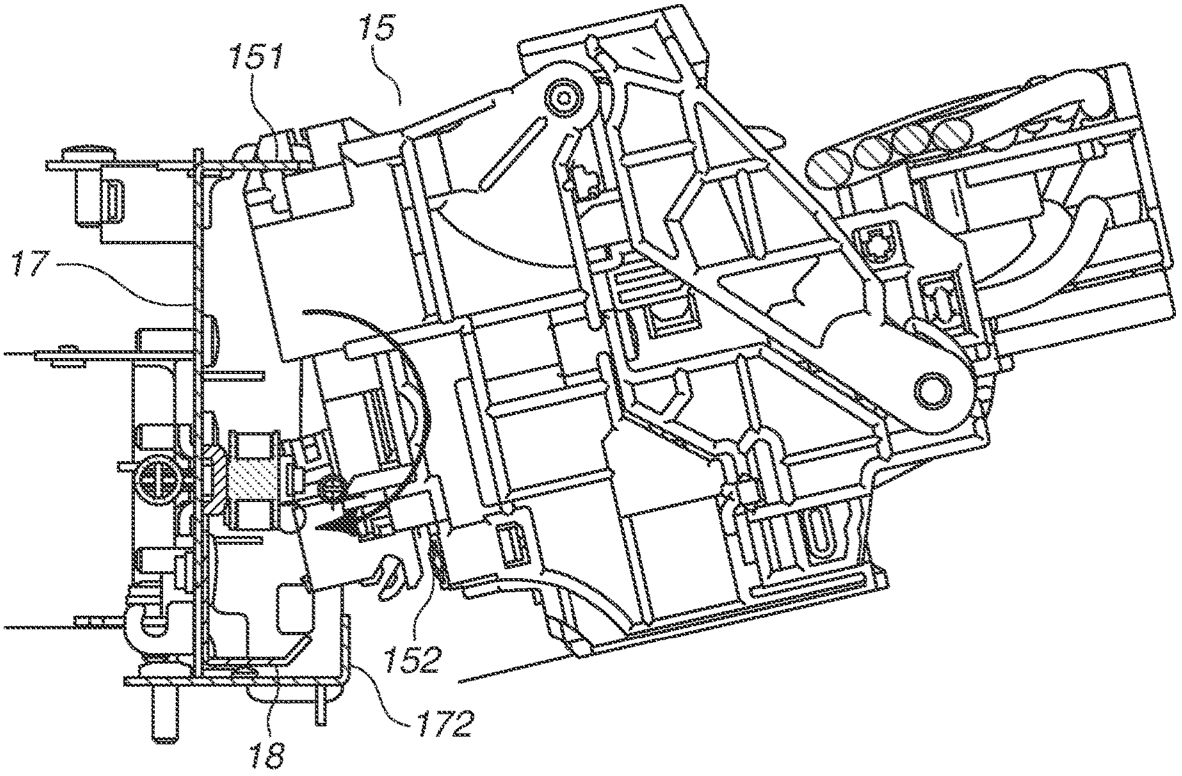
FIGS. 12A and 12B are diagrams illustrating a procedure of assembling the carriage into the frame.
Figure 12B:
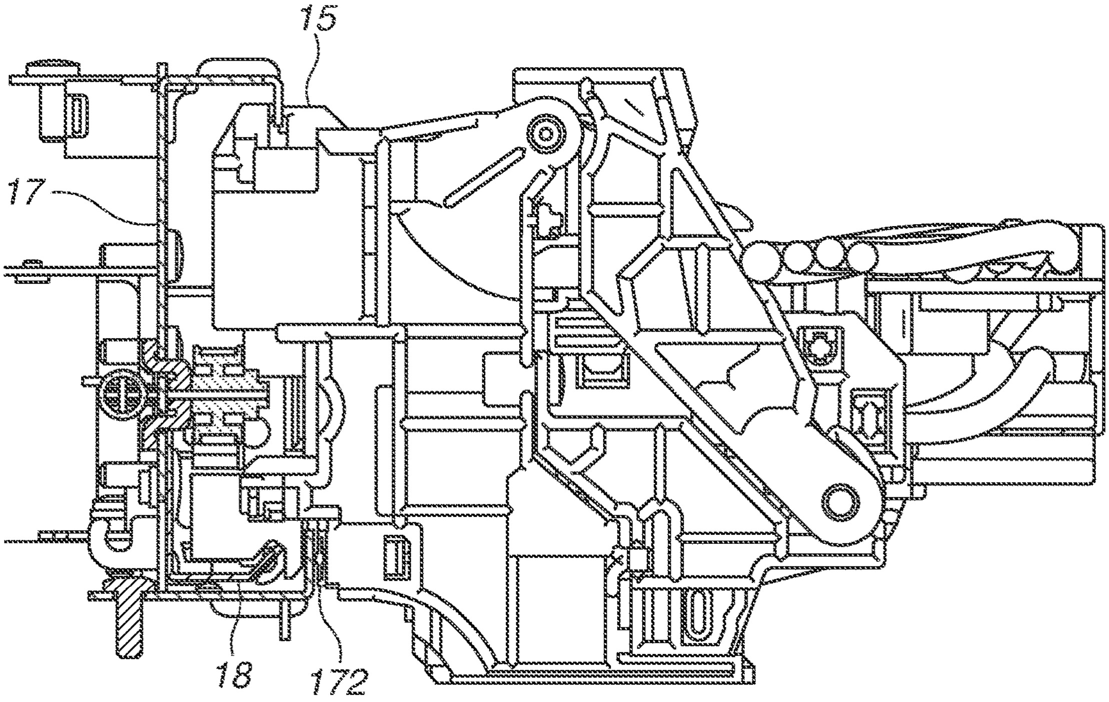

A procedure for assembling the carriage 15 into the frame 17 will be described with reference to FIGS. 10 to 12. FIG. 10 is a diagram illustrating an assembly position of the carriage 15 in the scanning direction. FIGS. 11A and 11B are diagrams illustrating the orientation of the carriage 15 being assembled. FIGS. 12A and 12B are cross-sectional views of the carriage 15 being assembled.

The carriage 15 includes movement restriction portions 32 that restrict the movement of the carriage 15. The guide member 18 is sandwiched between the sliding body 153 and the movement restriction portions 32 (FIG. 4A). Thus, the movement restriction portions 32 restrict the movement of the carriage 15 upward in the vertical direction or to upstream in the conveyance direction. However, taking the ease of replacement of the carriage 15 into account, any of the upper sliding portion 171, the left side plate 24, and the right side plate 25 needs to be a separate component in order to secure a path for assembling the carriage 15. However, the box-shaped frame 17 formed of one component needs to be differently configured. In the present exemplary embodiment, the frame 17 has an escape hole 26 for the upper abutment portion 151 of the carriage 15 to escape therein in part of the upper surface in a movable region of the carriage 15 in the scanning direction. A position at which the upper abutment portion 151 is inserted into the escape hole 26 constitutes the assembly position of the carriage 15. The carriage 15 includes a rotation restriction portion 27 that is in abutment with the upper sliding portion 171 to restrict rotation around an axis in the scanning direction. At the assembly position of the carriage 15 (FIG. 10), the upper sliding portion 171 has a cutout portion 29 corresponding to the rotation restriction portion 27. The cutout portion 29 is located outside a moving range of the upper sliding portion 171 at the time of recording operation. In this manner, even if the frame 17 has a box shape, the frame 17 is structured such that members thereof do not interfere with the path for assembling the carriage 15.

The procedure for assembling the carriage 15 into the frame 17 will be described. The carriage 15 is assembled into the frame 17 on the front side where the opening of the box-shaped structure is located. First, the carriage 15 is arranged at the assembly position into the frame 17. Then, the carriage 15 is inclined such that the upper abutment portion 151 becomes close to the frame 17. In this state, the carriage 15 is raised and the upper abutment portion 151 is inserted into the escape hole 26 in the frame 17 (FIG. 11A). With the upper abutment portion 151 allowed to escape into the escape hole 26, the carriage 15 is turned such that the rear surface of the carriage 15 becomes parallel to the fastening surface 173 of the frame 17 (FIG. 12A). The carriage 15 is lowered such that the lower abutment portion 152 of the carriage 15 abuts on the lower sliding portion 172. Accordingly, the upper abutment portion 151 abuts on the upper sliding portion 171, and the lower abutment portion 152 abuts on the lower sliding portion 172. Then, the sliding body 153 abuts on the guide surface 181. As a result, the carriage 15 is supported by the guide member 18 from below. The guide member 18 is adjusted in height by the adjustment portions with respect to the frame 17, and is fastened to the frame 17 by the fastening portions 30. In this manner, even if the frame 17 has a box shape, the number of steps in the process of assembling the carriage 15 can be reduced.

In an ink-jet recording apparatus, it is important to keep a constant relative distance between the recording head and the platen supporting the sheet in order for the recording head to eject ink while performing scanning. However, vibration generated by a movement of the carriage may affect the relative distance between the recording head and the platen. Therefore, the structure of the frame less susceptible to the vibration of the carriage is required. Use of the configuration as described above makes it possible to provide a recording apparatus including a frame capable of properly supporting a carriage.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-167715, filed Oct. 12, 2021, which is hereby incorporated by reference herein in its entirety.

What is claimed is:

1. A recording apparatus comprising:

a conveyance unit configured to convey a sheet in a conveyance direction;

a carriage configured to move in a scanning direction crossing the conveyance direction and having a first abutment portion and a second abutment portion higher in position than the first abutment portion;

a recording head mounted on the carriage, arranged to face a sheet conveyed by the conveyance unit, and configured to eject a liquid onto the conveyed sheet to record an image;

a frame having a first sliding portion in abutment with the first abutment portion and having a second sliding portion in abutment with the second abutment portion;

a guide member that is configured to support the carriage and is fixed to the frame at a position separated from the first sliding portion; and a sliding body configured to support the carriage in abutment with a guide surface of the guide member, wherein the carriage includes a movement restriction portion configured to restrict a movement of the carriage, and wherein the guide member is disposed between the movement restriction portion and the sliding body.

2. The recording apparatus according to claim 1, wherein the first sliding portion is subjected to a force in a direction opposite to the conveyance direction from the carriage, and the second sliding portion is subjected to a force in the conveyance direction from the carriage.

3. The recording apparatus according to claim 1, wherein a fastening surface where the guide member and the frame are fastened to each other is parallel to a sliding surface of the first sliding portion and a sliding surface of the second sliding portion.

4. The recording apparatus according to claim 3, wherein the frame has an escape hole into which the second abutment portion escapes at a time of assembly of the carriage into the frame.

5. The recording apparatus according to claim 1, further comprising a first side plate at one end of the frame and a second side plate at the other end of the frame in the scanning direction, wherein the first sliding portion and the second sliding portion of the frame are fixed by the first side plate and the second side plate.

6. The recording apparatus according to claim 5, wherein the first sliding portion, the second sliding portion, the first side plate, and the second side plate are formed from one member.

7. The recording apparatus according to claim 1, further comprising a platen facing the recording head, wherein at least one of the guide member and the frame includes an adjustment portion configured to adjust a space between the platen and the recording head before the guide member is fastened to the frame.

8. A recording apparatus comprising:

a conveyance unit configured to convey a sheet in a conveyance direction;

a carriage configured to move in a scanning direction crossing the conveyance direction and having a first abutment portion and a second abutment portion higher in position than the first abutment portion;

a recording head mounted on the carriage, arranged to face a sheet conveyed by the conveyance unit, and configured to eject a liquid onto the conveyed sheet to record an image;

a frame having a first sliding portion in abutment with the first abutment portion and having a second sliding portion in abutment with the second abutment portion; and a guide member that is configured to support the carriage and is fixed to the frame at a position separated from the first sliding portion;

wherein a guide surface of the guide member is inclined upward with respect to the conveyance direction and supports the carriage.

9. The recording apparatus according to claim 8, further comprising a sliding body configured to support the carriage in abutment with a guide surface of the guide member.

10. The recording apparatus according to claim 8, wherein the first sliding portion is subjected to a force in a direction opposite to the conveyance direction from the carriage, and the second sliding portion is subjected to a force in the conveyance direction from the carriage.

11. The recording apparatus according to claim 8, wherein a fastening surface where the guide member and the frame are fastened to each other is parallel to a sliding surface of the first sliding portion and a sliding surface of the second sliding portion.

12. A recording apparatus comprising:

a conveyance unit configured to convey a sheet in a conveyance direction;

a carriage configured to move in a scanning direction crossing the conveyance direction and having a first abutment portion and a second abutment portion higher in position than the first abutment portion;

a recording head mounted on the carriage, arranged to face a sheet conveyed by the conveyance unit, and configured to eject a liquid onto the conveyed sheet to record an image;

a frame having a first sliding portion in abutment with the first abutment portion and having a second sliding portion in abutment with the second abutment portion; and a guide member that is configured to support the carriage and is fixed to the frame at a position separated from the first sliding portion;

wherein the carriage includes a rotation restriction portion configured to restrict rotation of the carriage at a position separated from the second abutment portion in the scanning direction, and wherein the second sliding portion of the frame is disposed between the second abutment portion and the rotation restriction portion in the conveyance direction.

13. The recording apparatus according to claim 12, wherein the second sliding portion has a cutout portion in an area corresponding to the rotation restriction portion at a time of assembly of the carriage into the frame.

14. The recording apparatus according to claim 12, further comprising a sliding body configured to support the carriage in abutment with a guide surface of the guide member.

15. The recording apparatus according to claim 12, wherein the first sliding portion is subjected to a force in a direction opposite to the conveyance direction from the carriage, and the second sliding portion is subjected to a force in the conveyance direction from the carriage.

16. The recording apparatus according to claim 12, wherein a fastening surface where the guide member and the frame are fastened to each other is parallel to a sliding surface of the first sliding portion and a sliding surface of the second sliding portion.

* * * * *